United States Patent
Xu et al.

(10) Patent No.: US 11,469,487 B2
(45) Date of Patent: Oct. 11, 2022

(54) BASE STATION ANTENNAS HAVING FULLY EMBEDDED RADIOS AND HOUSINGS WITH INTEGRATED HEAT SINK STRUCTURES

(71) Applicant: CommScope Technologies LLC, Hickory, NC (US)

(72) Inventors: YongJie Xu, Shanghai (CN); Sammit Patel, Dallas, TX (US); Michael Brobston, Allen, TX (US); Qiyun Gu, Shanghai (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/051,487

(22) PCT Filed: Apr. 22, 2019

(86) PCT No.: PCT/US2019/028459
§ 371 (c)(1),
(2) Date: Oct. 29, 2020

(87) PCT Pub. No.: WO2019/236203
PCT Pub. Date: Dec. 12, 2019

(65) Prior Publication Data
US 2021/0057796 A1  Feb. 25, 2021

(30) Foreign Application Priority Data
May 15, 2018  (CN) .......................... 2018104605317

(51) Int. Cl.
*H01Q 1/02* (2006.01)
*H01Q 1/24* (2006.01)
(Continued)

(52) U.S. Cl.
CPC ............... *H01Q 1/02* (2013.01); *H01Q 1/246* (2013.01); *H01Q 1/42* (2013.01); *H01Q 3/36* (2013.01); *H01Q 23/00* (2013.01); *H04B 1/40* (2013.01)

(58) Field of Classification Search
CPC ............ H01Q 1/42; H01Q 1/246; H01Q 1/02; H01Q 1/38; H01Q 21/065; H01Q 21/0025;
(Continued)

(56) References Cited

U.S. PATENT DOCUMENTS 7,346,311 B1 *  3/2008  Schwartz ........... H04B 7/15571
455/24
2001/0048397 A1 *  12/2001  Smith ...................... H01Q 1/02
343/702

(Continued)

FOREIGN PATENT DOCUMENTS

| JP | 2004039857 A | 2/2004 |
| JP | 2017063288 A | 3/2017 |
| WO | 2011068562 A1 | 6/2011 |

OTHER PUBLICATIONS

International Search Report and the Written Opinion of the International Searching Authority corresponding to International Patent Application No. PCT/US2019/028459 (10 pages) (dated Nov. 26, 2019).

(Continued)

*Primary Examiner* — Ajibola A Akinyemi
(74) *Attorney, Agent, or Firm* — Myers Bigel, P.A.

(57) ABSTRACT

Active antennas are provided that include a housing having a front surface, first and second side surfaces and a rear surface, where the front surface comprises a radome and the first and second side surfaces comprise respective first and second thermally-conducting frame members. These antennas further include at least one radio that is completely mounted within an interior of the housing. Each of the first
(Continued)

and second thermally-conducting frame members includes a plurality of outwardly extending fins.

20 Claims, 7 Drawing Sheets

(51) Int. Cl.
    *H01Q 1/42*         (2006.01)
    *H01Q 3/36*         (2006.01)
    *H01Q 23/00*       (2006.01)
    *H04B 1/40*        (2015.01)

(58) Field of Classification Search
    CPC .... H01Q 1/3233; H01Q 1/1228; H01Q 1/422;
                H01Q 21/062; H01Q 21/26; H01Q 3/04;
                H01Q 5/42; H01Q 19/108; H01Q 1/1207;
                H01Q 1/125; H01Q 1/2283; H01Q
                1/2291; H01Q 21/00; H01Q 21/08
    USPC ........................................................ 455/575
    See application file for complete search history.

(56) References Cited

U.S. PATENT DOCUMENTS

| | | | |
|---|---|---|---|
| 2008/0252552 A1* | 10/2008 | Goebel | H01Q 21/062 |
| | | | 343/872 |
| 2011/0032158 A1* | 2/2011 | Rodger | H01Q 1/42 |
| | | | 343/702 |
| 2011/0209864 A1* | 9/2011 | Figus | F28D 15/0275 |
| | | | 165/287 |
| 2013/0222201 A1 | 8/2013 | Ma et al. | |
| 2017/0214150 A1* | 7/2017 | Zhao | H01Q 21/062 |
| 2018/0219277 A1 | 8/2018 | Hirata et al. | |

OTHER PUBLICATIONS

Extended European Search Report corresponding to European Patent Application No. 19814738.1 (10 pages) (dated Dec. 15, 2021).

* cited by examiner

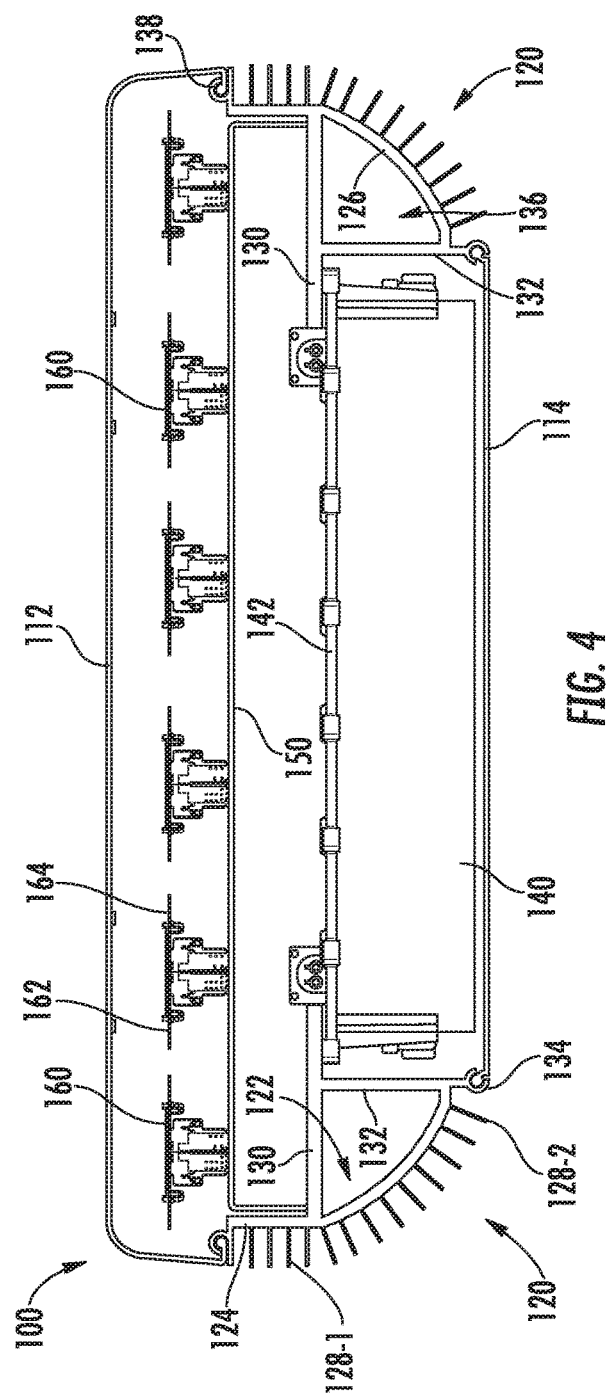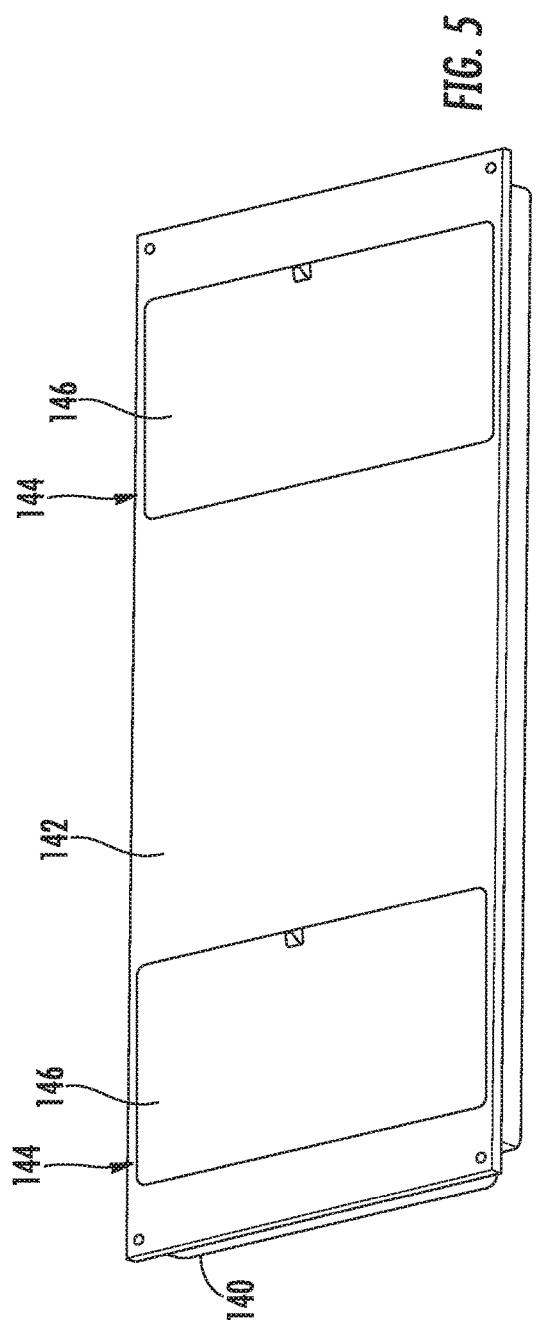

BASE STATION ANTENNAS HAVING FULLY EMBEDDED RADIOS AND HOUSINGS WITH INTEGRATED HEAT SINK STRUCTURES

RELATED APPLICATIONS

This application is a 35 USC § 371 US national stage application of PCT/US2019/028459, filed Apr. 22, 2019, which claims the benefit of and priority to Chinese Patent Application Serial Number 201810460531.7, filed May 15, 2018, the contents of which are hereby incorporated by reference as if recited in full herein.

FIELD

The present invention relates to communications systems and, more particularly, to base station antennas that have integrated radios.

BACKGROUND

Cellular communications systems are now widely deployed. In a typical cellular communications system, a geographic area is divided into a series of regions that are referred to as "cells," and each cell is served by a base station. The base station may include baseband equipment, radios and antennas that are configured to provide two-way radio frequency ("RF") communications with subscribers that are positioned throughout the cell. The base station antennas generate radiation beams ("antenna beams") that are directed outwardly to serve the entire cell or a portion thereof. Typically, a base station antenna includes one or more phase-controlled arrays of radiating elements, which are commonly referred to as phased array antennas. The radiating elements are typically arranged in one or more vertical columns when the antenna is mounted for use. An RF signal that is to be transmitted by a phased array antenna is divided into a plurality of sub-components, and each sub-component of the RF signal is then transmitted through a respective radiating element or sub-array of radiating elements.

Base station antennas are now being deployed that have one or more radios incorporated into the antenna. For example, some base station antennas have full two-dimensional beam-steering capabilities that allow the antenna to generate small, highly-focused antenna beams that can be steered by phase-weighting the sub-components of the RF signal that are transmitted/received at the different sub-arrays of radiating elements as opposed to a constant antenna beam that covers a full sector. These antennas may have a two-dimensional array that includes multiple rows and columns of radiating elements with individual transceivers (radios) mounted within the antenna to provide independent amplitude and/or phase control for each radiating element in the array (or for individual sub-groups of radiating elements). As another example, base station antennas that have radios incorporated therein are being deployed that have less sophisticated beam-steering capabilities, such as the ability to scan the antenna beam in the azimuth plane. As yet another example, conventional "passive" base station antennas may be modified to have one or more remote radio heads incorporated into the antenna in order to avoid the need to separately mount the remote radio heads on the antenna tower (which may involve additional costs and which results in additional "clutter" on the antenna tower). For purposes of this disclosure, the term "active antenna" is used to encompass any base station antenna that has at least one transceiver (radio) incorporated therein.

While incorporating one or more radios into a base station antenna can provide increased throughput and/or have other advantages, adding radios to the antenna may increase the size, weight, cost and complexity of the antenna. Additionally, the radios may operate at high power levels which may also introduce concerns with respect to heat generated in the antenna that can negatively affect the performance of the radios.

SUMMARY

Pursuant to some embodiments of the present invention, active antennas are provided that include a housing having a front surface, first and second side surfaces and a rear surface, where the front surface comprises a radome and the first and second side surfaces comprise respective first and second thermally-conducting frame members. These antennas further include at least one radio that is completely mounted within an interior of the housing. The antennas further include a backplane and a plurality of radiating elements that are mounted to extend forwardly from the backplane. Each of the first and second thermally-conducting frame members includes a plurality of outwardly extending fins.

In some embodiments, at least some of the fins extend radially outwardly from a curved surface. The first and second thermally-conducting frame members may be formed via extrusion. The at least one radio may be is mounted between the first and second thermally-conducting frame members and may form a part of a frame that provides structural rigidity to the active antenna.

In some embodiments, the active antenna may further include at least one heat pipe that is positioned to transfer heat generated by the at least one radio to the first thermally-conducting frame member. The heat pipe may comprise, for example, a vapor chamber. The first thermally-conducting frame member may also include a channel that is between at least some of the fins and the at least one radio. A fan may be provided that is configured to move air through the channel.

In some embodiments, the at least one radio may include a plurality of ports, and a plurality of phase shifters may be mounted on a rear surface of the backplane. In such embodiments, a plurality of phase cables may be provided that each includes a first end having a threaded connector and a second end that is soldered to a respective one of the phase shifters.

Pursuant to further embodiments of the present invention, active antennas are provided that include a rigid frame comprising a first thermally-conducting frame member, a second thermally-conducting frame member and a radio that extends between the first and second thermally-conducting frame members. These antennas further include a backplane that is mounted forwardly from the rigid frame, a rear plate that extends between the first and second thermally-conducting frame members and that covers a rear surface of the radio, and a radome mounted on at least one of the rigid frame and the backplane.

In some embodiments, each of the first and second thermally-conducting frame members may include a plurality of outwardly extending fins. In such embodiments, at least some of the fins may extend radially outwardly from a curved surface.

In some embodiments, the active antenna may further include at least one heat pipe that is positioned to transfer heat generated by the radio to the first and second thermally-conducting frame members. The heat pipe may comprise any suitable heat pipe structure. In some embodiments, the heat pipe may be a generally flat heat pipe such as various vapor chamber designs.

In some embodiments, the first and second thermally-conducting frame members may each include a respective channel that is between at least some of the fins and the at least one radio. In such embodiments, a fan may be provided (e.g., mounted in the channel) that is configured to move air through the channel.

Pursuant to additional embodiments of the present invention, active antennas are provided that include a first and second thermally-conducting frame members that each have a plurality of outwardly extending fins, a radio having a heat pipe mounted thereon, the heat pipe in thermal communication with the first and second thermally-conducting frame members, a backplane mounted in front of the radio, and a plurality of radiating elements that are mounted to extend forwardly from the backplane. In these antennas, at least some of the fins extend radially outwardly from a curved surface. In some embodiments, the heat pipe may be a vapor chamber.

In some embodiments, the radio may be mounted between the first and second thermally-conducting frame members and the radio and the first and second thermally-conducting frame members form at least part of a frame that provides structural rigidity to the active antenna.

In some embodiments, the first thermally-conducting frame member may include a channel that is between at least some of the fins and the at least one radio.

In some embodiments, the first and second thermally-conducting frame members may comprise part of a housing of the active antenna, and the radio may be completely mounted within an interior of the housing.

BRIEF DESCRIPTION OF THE DRAWINGS

FIG. 4 is a schematic cross-sectional view of the active antenna of FIGS. 2-3.

FIG. 5 is a perspective view of a base plate having integrated heat pipes (in the form of vapor chambers) that may be used as a mounting plate for a radio included in the active antenna of FIGS. 2-3.

DETAILED DESCRIPTION

Figure 1:
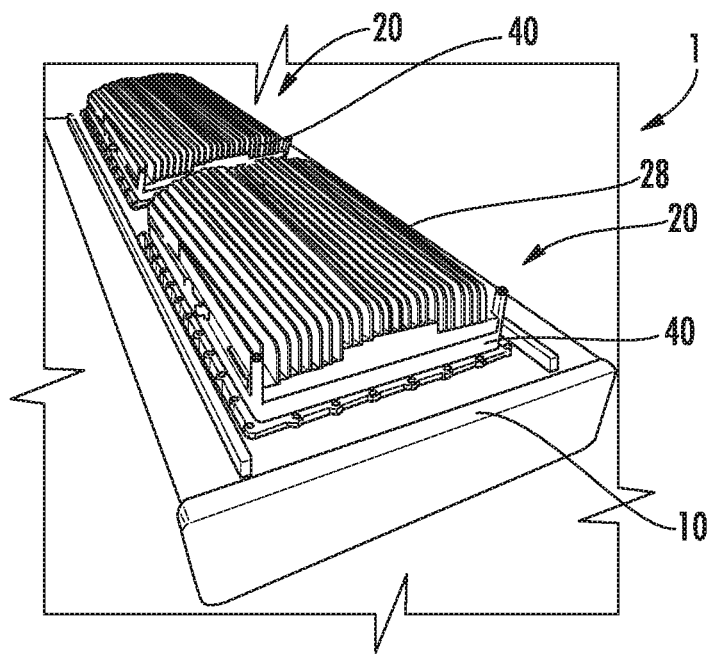
FIG. 1 is a perspective rear view of a conventional active antenna.

Pursuant to embodiments of the present invention, active antennas are provided that have radios that are fully enclosed within a housing of the antenna. Such a design simplifies the waterproofing necessary to protect the radio from water and moisture ingress. These active antennas may have housings that have thermally-conducting frame members with heat sink, structures integrated therein that are configured to disperse heat generated by the radios from the housing. The provision of these thermally-conducting frame members may eliminate any need to attach finned heat sinks to the radios. In some embodiments, the active antennas may include one or more vapor chambers or other heat pipes that are configured to transfer heat generated by the radios to the thermally-conducting frame members. The heat sink structures that are integrated into the thermally-conducting frame members may comprise, for example, a plurality of fins.

The finned thermally-conducting frame members that are included in the housings of the active antennas according to some embodiments of the present invention may be formed, for example, by extrusion. In contrast, the finned heat sink structures that have conventionally been employed on active radios are formed via die casting or computer numerical control ("CNC") machining processes. The tooling and labor costs required for die casting or CNC machining may be significantly more expensive than the tooling costs for extruded structures (e.g., an order of magnitude difference). Additionally, die cast or CNC machined structures may have dimensional limitations (e.g., minimum thickness requirements) that exceed the dimensional requirements for extruded structures (e.g., fins formed by die casting or CNC machining may need to be thicker than fins formed using an extrusion process). Thus, the active antennas according to embodiments of the present invention may also be less expensive to manufacture and/or provide improved performance as compared to conventional active antennas.

Additionally, the extruded thermally-conducting frame members used in the active antennas according to embodiments of the present invention may have thinner fins than conventional die cast finned heat sink structures, and may be formed using aluminum that has better thermal conductivity properties. As a result, the thermally-conducting frame members used in the active antennas according to embodiments of the present invention may have significantly improved thermal performance as compared to active radios that include conventional die cast finned heat sinks. Moreover, the thermally-conducting frame members may use less material and be significantly lighter than the conventional die cast heat sink structures, and may also be used to replace at least some of the frame of the antenna. Thus, the active antennas according to embodiments of the present invention may be lighter and/or cheaper to manufacture than comparable conventional active antennas.

By integrating the heat sink structures into the frame and/or housing of the antenna, the radios included in the active antennas according to embodiments of the present invention may not include any finned heat sinks that extend through the antenna housing. As a result, the radios may be fully enclosed within the antenna housing, and hence much simpler and less expensive waterproofing techniques may be used. In addition, since the radios in conventional active antennas are typically mounted at the back of the antenna, the finned heat sink structures typically extend rearwardly from conventional antennas which may complicate the antenna mounting hardware required and/or the installation process. The active antennas according to embodiments of the present invention may also be thinner than conventional active antennas (due to the elimination of the rearwardly extending finned heat sink structures) and may be more aesthetic.

Another advantage of the active antennas according to embodiments of the present invention is that eliminating the finned heat sinks from the radios allows the radios to be mounted in the antenna so that the RF ports of the radios extend rearwardly. This allows the phase cables that extend between the radios and phase shifters of the antenna to each have one end connected to a respective one of the phase shifters by a soldered connection, and the other end connected to a respective one the radio ports via a threaded connector. In contrast, conventional active antennas have used blind mate push-on connectors or phase cables that have connectors on both ends which may result in increased levels of passive intermodulation distortion ("PIM"). As is known in the art, PIM can significantly degrade the RF performance of a wireless communications system.

Embodiments of the present invention will now be discussed in further detail with reference to the attached drawings.

FIG. 1 is a perspective rear view of a conventional active antenna 1. As shown in FIG. 1, the active antenna 1 includes a housing 10. A pair of radios 40 are mounted to the housing 10. As the radios 40 may generate significant amounts of heat, it may be necessary to vent heat from the active antenna 1 in order to prevent the radios 40 from overheating. Accordingly, each radio 40 includes a die cast heat sink 20 that is mounted on the rear surface of the radio 40. The heat sinks 20 are formed of a thermally conductive material (e.g., aluminum) and include a plurality of fins 28. Heat generated in the radios 40 passes to the heat sink 20 and spreads to the fins 28. As shown in FIG. 1, the finned heat sink 20 extends through the rear of the housing 10 of antenna 1 so that the fins 28 are external to the antenna housing 10. This allows the heat to pass from the fins 28 to the external environment.

Figure 6:
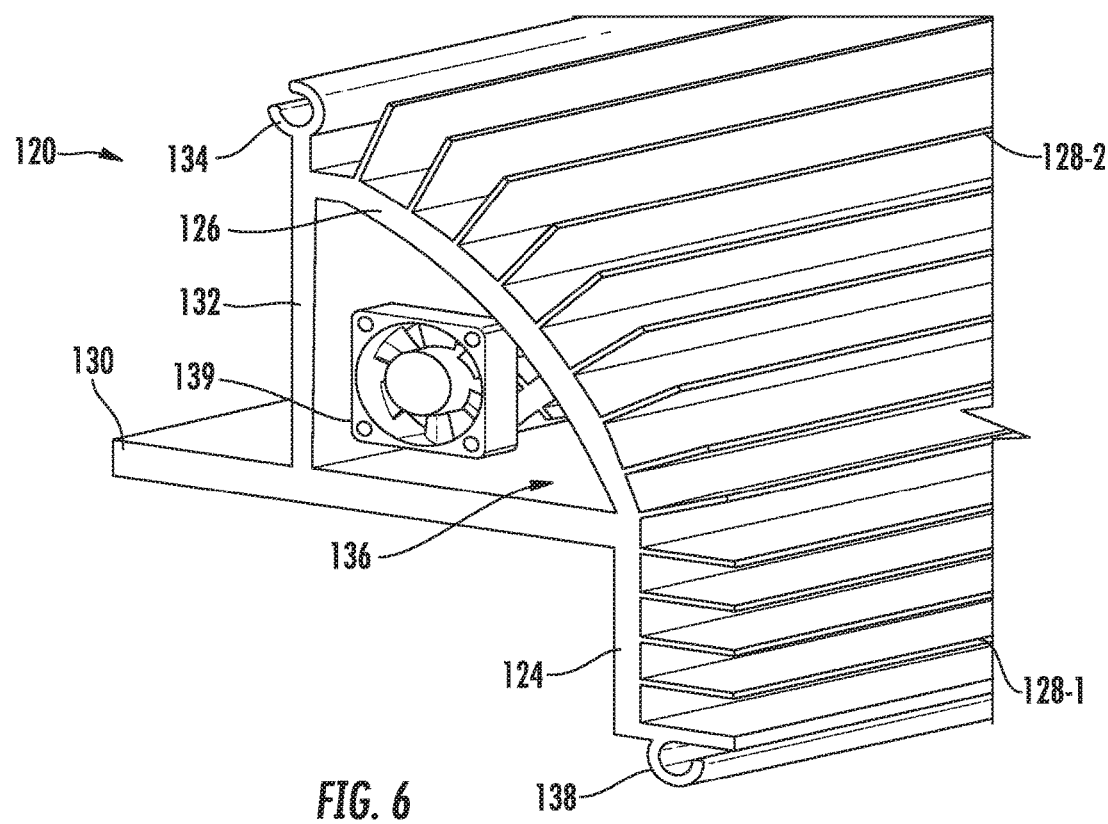
FIG. 6 is an enlarged partial perspective view of one of the thermally-conducting frame members of the active antenna of FIGS. 2-3 illustrating a fan mounted thereon.
Figure 7:
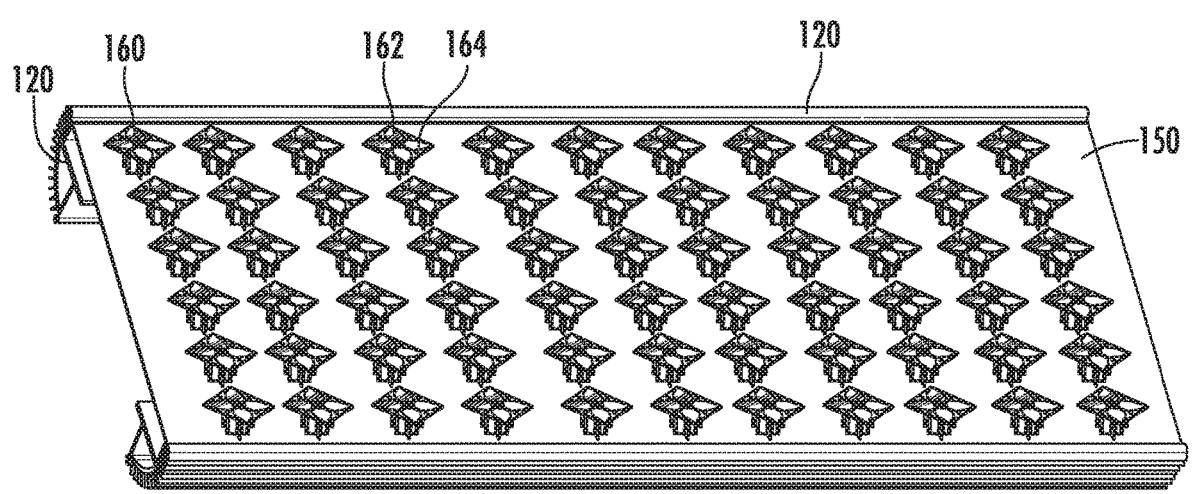
FIG. 7 is a schematic perspective front view of the backplane and thermally-conducting frame members of the active antenna of FIGS. 2-3 illustrating the columns of radiating elements that are mounted on the backplane.
Figure 8:
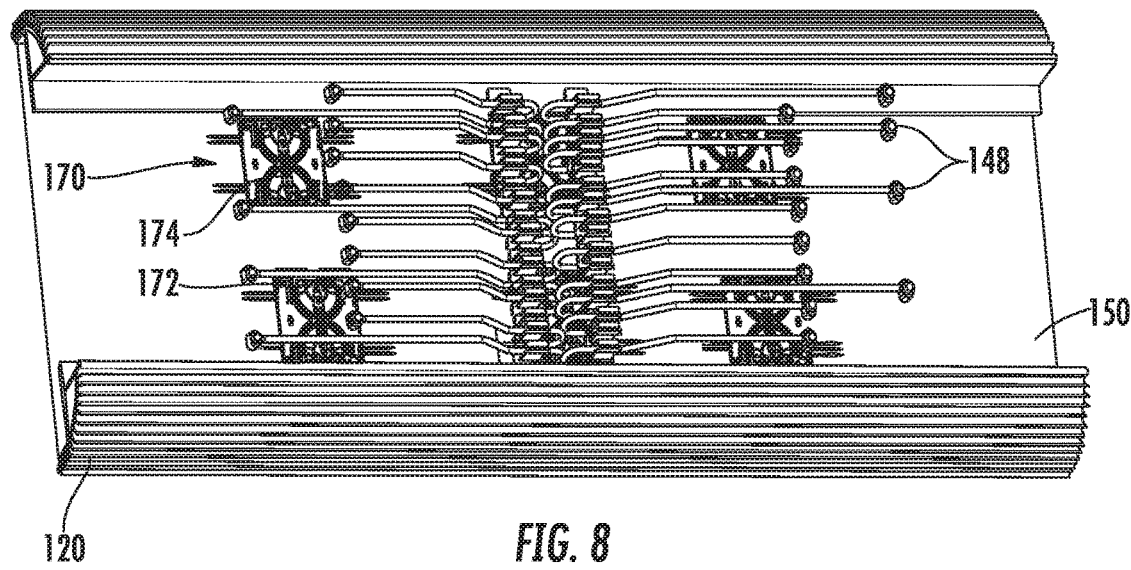
FIG. 8 is a schematic perspective back view of the backplane and thermally-conducting frame members of the active antenna of FIGS. 2-3 illustrating mounting locations for the phase shifter assemblies on the rear side of the backplane.
Figure 9:
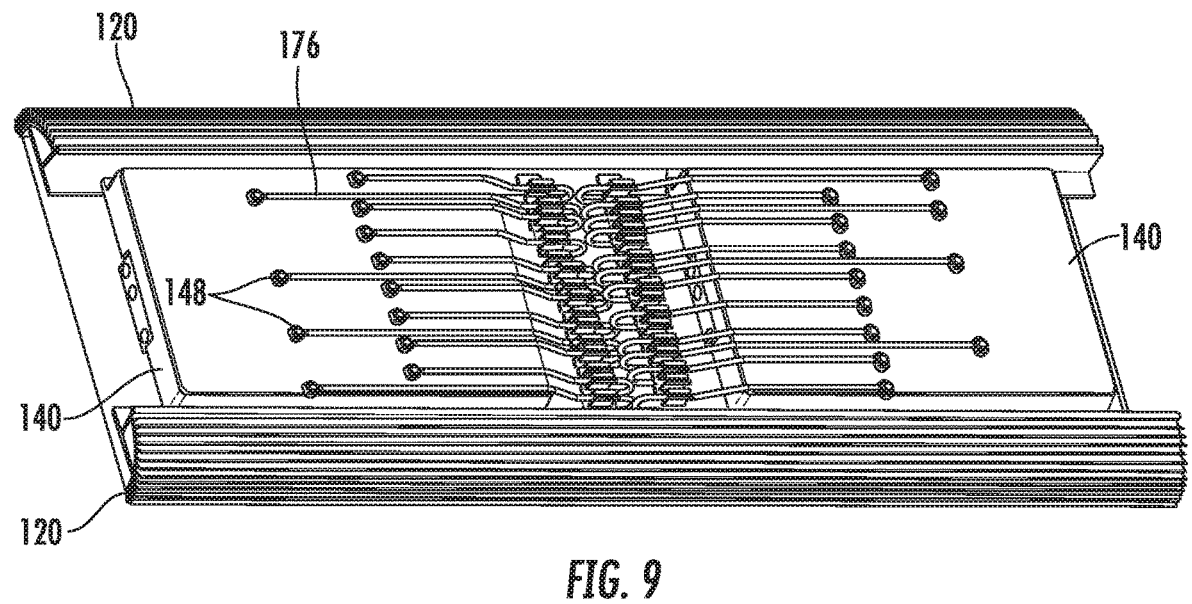
FIG. 9 is a schematic back perspective view of the active antenna of FIGS. 2-3 with a back plate of the antenna removed to show the radios.
Figure 10:
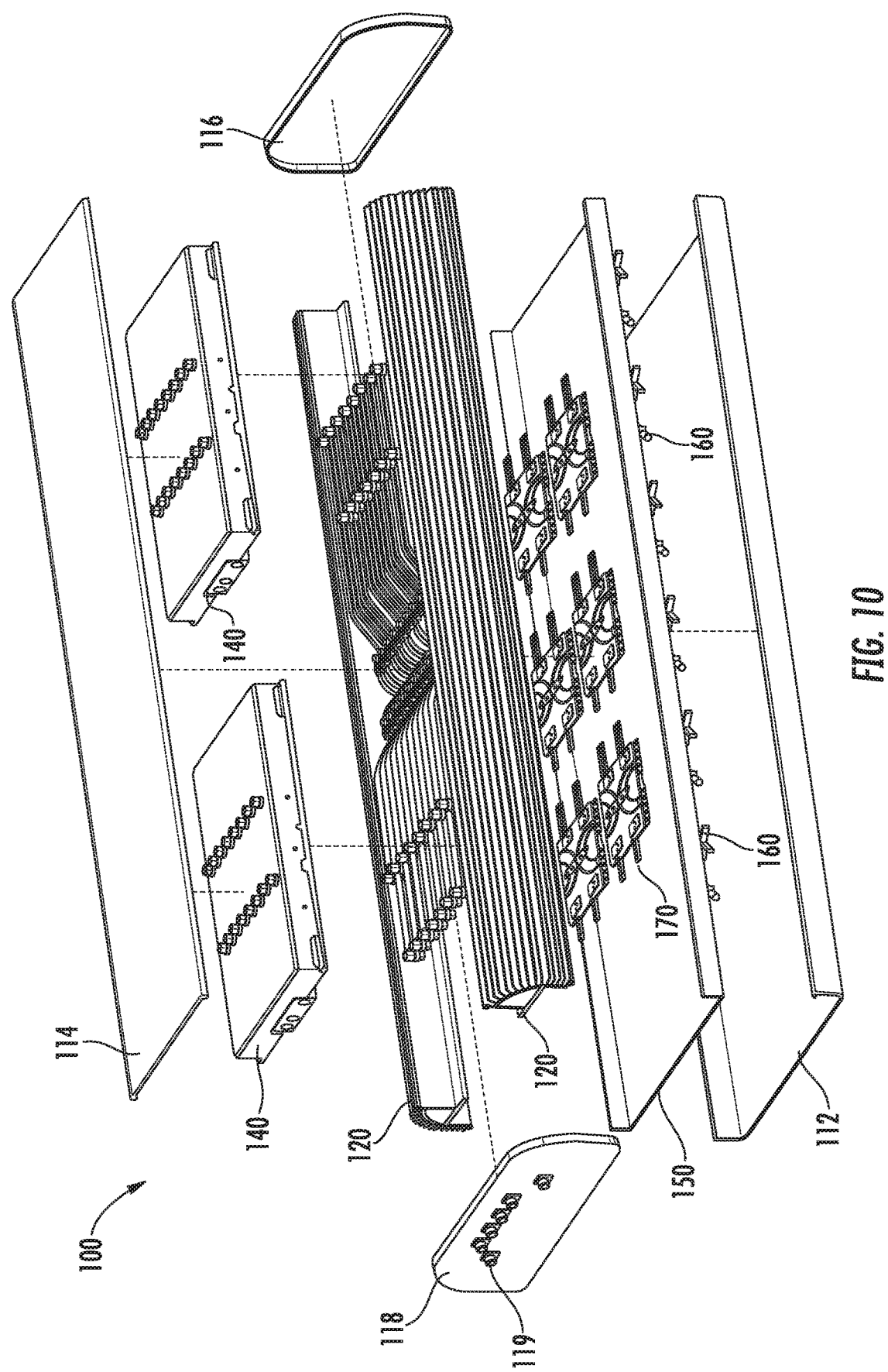
FIG. 10 is a schematic exploded perspective view of the active antenna of FIGS. 2-3.

FIGS. 2-10 illustrate an active antenna 100 according to an embodiment of the present invention. In particular, FIG. 2 includes a perspective front view and a perspective back view of an active antenna 100, while FIG. 3 includes a front view, a side view, a back view and a bottom view of the active antenna 100. FIG. 4 is a schematic cross-sectional view of the active antenna 100, and FIG. 5 is a perspective view of a base plate having integrated heat pipes in the form of vapor chambers that may be used as a mounting plate for the radios. FIG. 6 is an enlarged partial perspective view of one of the thermally-conducting frame members of the active antenna 100. FIGS. 7 and 8 are schematic perspective front and back views, respectively, of the back plane and thermally-conducting frame members of the active antenna 100 illustrating various components that may be mounted on the backplane. FIG. 9 is a schematic back perspective view of the active antenna 100 with a back plate of the antenna removed to show the radios. Finally, FIG. 10 is a schematic exploded perspective view of the active antenna 100.

Figure 2:
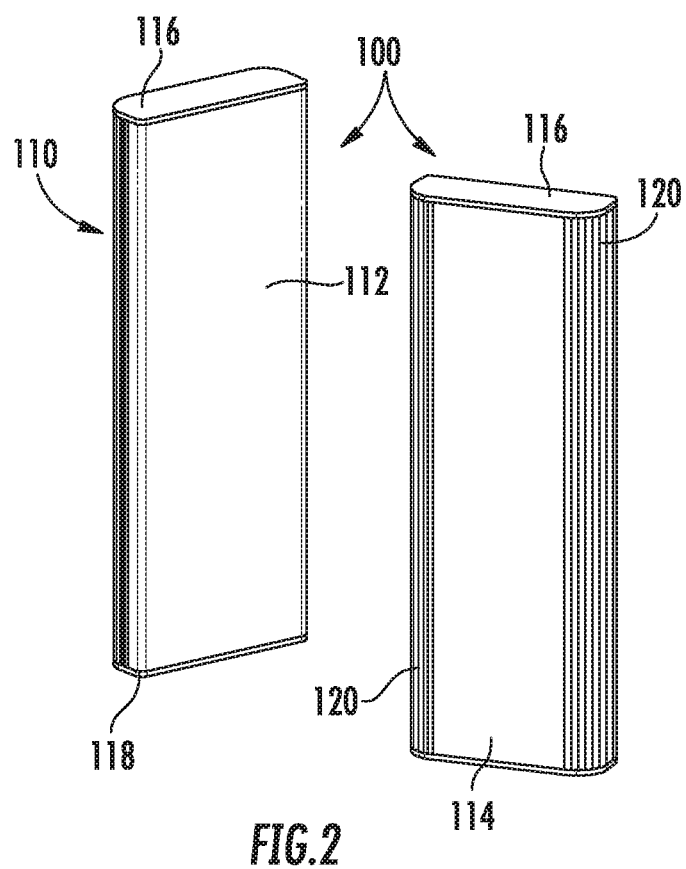
FIG. 2 is a perspective front view and a perspective back view of an active antenna according to embodiments of the present invention.
Figure 3:
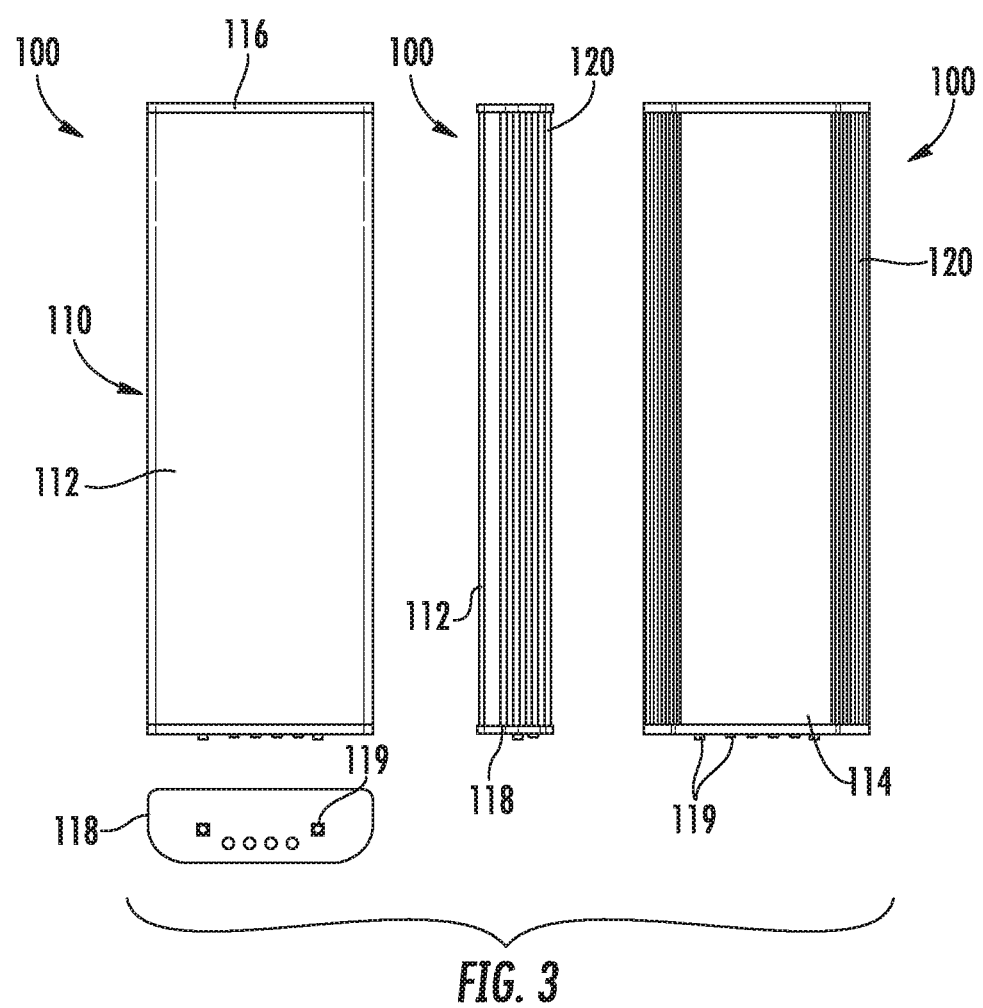
FIG. 3 includes front, side, back and bottom views of the active antenna of FIG. 2.

Referring first to FIGS. 2-3, the active antenna 100 includes a housing 110. In the depicted embodiment, the housing includes a radome 112, a back plate 114, a top cap 116, a bottom cap 118 and first and second thermally-conducting frame members 120. The radome 112 may form the front surface and forward portions of the side surfaces of the housing 110, and the back plate 114 may form most (or all) of the rear surface of housing 110. The radome 112 may be fabricated in a conventional manner and may include a front surface that is substantially transparent to RF energy in the operating frequency range of the active antenna 100. The back plate 114 may comprise, for example, a plastic or metal component that extends between the first and second thermally-conducting frame members 120 to enclose the rear of the active antenna 100. The top cap 116 and the bottom cap 118 may be glued (or otherwise attached) to the radome 112, the first and second thermally-conducting frame members 120 and/or the back plate 114 to provide environmental protection. The bottom cap 118 may further include a plurality of connectors 119. Cables (not shown) may be attached to the connectors 119 to provide wired connections between, for example, baseband equipment, control equipment and/or power supplies of a cellular base station that includes active antenna 100.

Referring next to FIGS. 4 and 9, it can be seen that the active antenna 100 has a pair of radios 140 mounted therein. The radios 140 may be vertically stacked and mounted within the rear of the housing 110, just forward of the back plate 114. As shown in FIG. 4, the radios 140 lack any finned heat sink and hence may be mounted completely within the interior of the antenna 100 as defined by housing 110. As such, the housing 110 may provide environmental protection against water and moisture ingress, and hence additional waterproofing steps that may be necessary when portions of the radio (e.g., a finned heat sink structure) extend outside the housing may not be necessary with active antenna 100.

As is further shown in FIGS. 4 and 9, the first and second thermally-conducting frame members 120 may form at least a portion of the respective sidewalls of the housing 110. The first and second thermally-conducting frame members 120 may each comprise a rail that extends substantially the entire length of the active antenna 100, although embodiments of the present invention are not limited thereto. Each thermally-conducting frame member 120 may be formed of a thermally-conductive material such as a metal. In some embodiments, the thermally-conducting frame members 120 may be formed of aluminum or another lightweight, strong material that has good thermal conductivity. As described in greater detail below, each thermally-conducting frame member 120 may include an integrated heat sink having a plurality of fins 128. In some embodiments, the first and second thermally-conducting frame members 120 may be identical to each other.

In the depicted embodiment, each thermally-conducting frame member 120 includes an outer wall 122. In the depicted embodiment, the outer wall 122 includes a straight section 124 that forms a portion of a sidewall of the housing 110 and a curved section 126 that creates a curved transition between the sidewall and the back wall of the housing 110. A plurality of fins 128 may extend outwardly from the outer wall 122, including first fins 128-1 that extend outwardly from the straight section 124 of outer wall 122 and second fins 128-2 that extend outwardly from the curved section 126 of outer wall 122. Fins 128-1 may extend parallel to one another, while fins 128-2 may extend radially from the curved section 126. In an example embodiment, each thermally-conducting frame member 120 may have about fifteen fins 128, although more or fewer fins 128 may be included. Each fin 128 may extend outwardly about 15 mm to about 25 mm in an example embodiment, and a thickness of each fin 128 may be about 1 mm to about 2 mm. The outer wall 122 may have a thickness, for example, of about 4-10 mm.

Each thermally-conducting frame member 120 further includes an inwardly-extending flange 130 that extends inwardly from the outer wall 122 and a rearwardly-extending flange 132 that extends rearwardly from the inwardly-extending flange 130. The rearwardly-extending flange 132 may connect to the outer wall 122, as shown. An end of the rearwardly-extending flange 132 may include a C-shaped groove (in cross-section) 134 that is configured to receive an edge of the back plate 114 so that the back plate 114 may be mounted to the first and second thermally-conducting frame members 120. The outer wall 122, the inwardly-extending flange 130 and the rearwardly-extending flange 132 may together define an enclosed channel 136 (that has open ends) that runs substantially the length of the active antenna 100. It will be appreciated that either the inwardly-extending flange 130 or the rearwardly-extending flange 132 may be omitted in some embodiments, in which case the channel 136 may be an open channel. Finally, another C-shaped groove 138 may be provided on the forward most of the first fins 128-1 that is configured to receive an edge of the radome 112 so that the radome 112 may also be mounted to the first and second thermally-conducting frame members 120.

As can also be seen in FIGS. 4 and 9, the radios 140 may be mounted to extend between the first and second thermally-conducting frame members 120. In some embodiments, the radios 140 may be directly attached to the first and second thermally-conducting frame members 120, while in other embodiments, a base plate 142 may extend between the first and second thermally-conducting frame members 120 and the radio 140 may be attached to the base plate 142. In still other embodiments, the first and second thermally-conducting frame members 120 may be formed as a single integral frame member. For example, the internally-extending flanges 130 of each frame member 120 could extend further inwardly to create a metal plate that extended from the outer wall 122 of the first thermally-conducting frame member 120 to the outer wall 122 of the second thermally-conducting frame member 120.

As is known to those of skill in the art, base station antennas typically include a rigid frame that is used to support the various components that are included in the antenna. This frame may or may not be part of the antenna housing. In the depicted embodiment, the first and second thermally-conducting frame members 120 and the radios 140 may together comprise the rigid frame of the active antenna 100. By using the radios 140 to form part of the frame, the amount of material required to form the frame may be reduced, which may reduce the cost and weight of the active antenna 100.

As is further shown in FIG. 4, a backplane 150 may be mounted on the first and second thermally-conducting frame members 120. A plurality of radiating elements 160 may be mounted on the backplane 150. The backplane 150 may act as a reflector and/or as a ground plane for the radiating elements 160. The backplane 150 may be mounted forwardly of the radios 140, and the radiating elements 160 may extend forwardly from the backplane 150.

Referring next to FIG. 5, one of the radios 140 is shown. The radio 140 is mounted on a base plate 142, which may comprise a generally planar plate that is formed of a thermally conductive material such as, for example, aluminum. The base plate 142 includes a pair of recesses 144. A heat pipe 146 (in the form of a vapor chamber 146 in the depicted embodiment) is inserted into each recess 144. A heat pipe is a device that is used to spread heat.

One known type of heat pipe is a vapor chamber. A vapor chamber is a planar heat pipe that is used to spread heat in two dimensions. A vapor chamber is typically implemented as a generally planar enclosure that has an open interior. A wick structure is formed in the interior of the enclosure, and a liquid such as water is added to the chamber, which is then vacuum sealed. The wick distributes the liquid throughout the chamber. When heat is applied to one portion of the enclosure, the liquid turns to gas which tends to distribute to areas within the chamber that are at lower pressure levels (i.e., areas away from the heat source), and the vapor then cools in these areas and returns to liquid form. Capillary action then causes the liquid to move back to the portion of the chamber adjacent the heat source, allowing the process to continue indefinitely. However, while FIG. 5 illustrates an embodiment in which the heat pipe 146 is implemented as two vapor chambers that are integrated into the base plate 142, it will be appreciated that any type and number of heat pipe structure 146 may be used in other embodiments. For example, other types of heat pipes that could be used include variable conductance heat pipes, diode heat pipes, thermosyphins, loop heat pipes, etc.

Thus, referring to FIGS. 4 and 5, heat generated in the radios 140 may pass to the rear surfaces of the vapor chambers 146, which then distribute the heat to the front surfaces of the vapor chambers 146. The front surface of each vapor chamber 146 may overlap and directly contact the inwardly-extending flange 130 of a respective one of the thermally-conducting frame members 120. The heat may distribute throughout the first and second thermally-conducting frame members 120 to the outer walls 122 and fins 128 thereof. Much of the heat may, in this fashion, be vented to outside the housing 110 of active antenna 100.

As discussed above, each thermally-conducting frame member 120 may include a channel 136. FIG. 6 is an enlarged perspective view of an end of one of the thermally-conducting frame members 120 that illustrates the channel 136 in greater detail. As shown in FIG. 6, in some embodiments, a fan 139 may be mounted within the channel 136. The fan 139 may facilitate moving heat along the thermally-conducting frame member 120 so that the heat is more efficiently vented from the active antenna 100.

Referring next to FIGS. 7-9, additional aspects of the active antenna 100 will be described. As shown in FIG. 7, a plurality of radiating elements 160 are mounted on the backplane 150. The radiating elements 160 are illustrated in FIG. 7 as comprising six columns of cross-dipole radiating elements 160. Each cross-dipole radiating element 160 includes a first dipole 162 that is configured to radiate at a −45° linear polarization and a second dipole 164 that is configured to radiate at a +45° linear polarization. Six columns of radiating elements 160 that each include eleven cross-dipole radiating elements 160 are depicted in the example of FIG. 7, but it will be appreciated that different numbers of columns, different numbers of radiating elements 160 per column and different types of radiating elements 160 may be used in other embodiments.

Referring next to FIG. 8, the rear side of the backplane 150 is shown. The RF ports 148 that are included on the radios 140 are shown in FIG. 8 for context, even though the remainder of the radios 140 are not shown in FIG. 8 to better illustrate the electromechanical phase shifters 170 that are mounted on the rear surface of the backplane 150. In the depicted embodiment, a total of twelve phase shifters 170 are included in active antenna 100, but other numbers of phase shifters may be included in other embodiments, or the phase shifters 170 may be omitted.

As known to those of skill in the art, electromechanical phase shifters 170 are often included in base station antennas for applying an electronic downtilt to the antenna beams formed by the antenna. The electronic downtilt may be achieved by applying a phase taper to the sub-components of the RF signal that are applied to each radiating element in a column. The electronic downtilt may be used, for example to change the coverage area for the antenna beam(s) generated by the antenna.

When dual-polarized radiating elements 160 are used, two phase shifters 170 are typically provided for each column of radiating elements. Thus, a total of twelve phase shifters 170 are provided in active antenna 100. So-called phase cables 176 may extend from each RF port 148 of the radios 140 to respective ones of the phase shifters 170. In the present example, each radio 140 includes twelve RF ports 148, namely six −45° polarization ports 148 and six +45° polarization ports 148. In other words, the −45° dipoles 162 of the cross dipole radiating elements 160 in each column are connected to a respective one of the −45° ports 148, and the +45° dipoles 162 of the cross dipole radiating elements 160 in each column are connected to a respective one of the +45° RF ports 148. Note that the RF ports 148 are shown in FIGS. 8-10, but are not shown in FIG. 4 to simplify the drawing.

Each phase shifter 170 includes a main printed circuit board 172 and a wiper printed circuit board 174. A total of four phase cables 176 may be connected to each phase shifter 170, namely two from each radio 140. One of the radios 140 may transmit and receive signals in a first frequency band (e.g., the PCS frequency band) and the other radio 140 may transmit and receive signals in a second, different, frequency band (e.g., the AWS frequency band). A diplexer may be included on each main printed circuit board 172 that (1) combines transmit signals from two of the phase cables 176 that are then phase shifted and passed to the radiating elements 160 and (2) splits (based on frequency) RF signals received from the radiating elements 160 (after they are phase shifted) for delivery to the appropriate one of the two radios 140. While the diplexers are included on the phase shifter main printed circuit board 172 in the depicted embodiment, it will be appreciated that other types of diplexers (e.g., separate cavity diplexers) may be used in other embodiments.

As noted above, each phase cable 176 is connected between an RF port 148 on one of the radios 140 and one of the phase shifters 170. The end of each phase cable 176 that is connected to one of the phase shifters 170 may be soldered to the main printed circuit board 172 of the phase shifter 170. By using soldered connections, the PIM performance of the active antenna 100 may be improved.

Referring next to FIG. 9, the radios 140 may then be installed on the first and second thermally-conducting frame members 120. The radios 140 may be installed so that the RF ports 148 extend rearwardly (i.e., away from the reflector 150). The other end of each phase cable 176 may then be connected to a respective one of the RF ports 148. In the depicted embodiment, right angle threaded coaxial connectors are included on the phase cables 176 connecting the phase cables 176 to the respective RF ports 148. The right angle connectors may allow for the antenna housing 110 to be shorter in the depth direction, and the threaded connectors may provide better PIM performance than the blind-mate push-on connectors used in conventional active antennas.

FIG. 10 is an exploded perspective view of the active antenna 100.

Thus, as shown in FIGS. 2-10, the active antennas according to some embodiments of the present invention have a housing that has a front surface, first and second side surfaces and a rear surface. The antennas may include a radome that forms at least part of the front surface of the housing, and a pair of first and second thermally-conducting frame members that form the respective side surfaces of the antenna. The active antennas may include at least one radio, and this radio may be completely mounted within an interior of the housing so that the housing provides environmental protection to the radio. The active antennas may further include a backplane that has a plurality of radiating elements mounted thereon. Moreover, the thermally-conducting frame members may each include a plurality of outwardly extending fins that are used to vent heat from the radio outside of the antenna.

Active antennas according to other embodiments of the present invention may include a rigid frame. The rigid frame may include first and second thermally-conducting frame members 120 and one or more radios 140 that extend between the first and second thermally-conducting frame members 120 to form a rigid support structure that extends for substantially the entire length of the antenna 100. These antennas 100 may further include a backplane 150 that is mounted to extend forwardly from the rigid frame, a radome 112 that is mounted on at least one of the rigid frame and the backplane 150, and a back plate 114 that extends between the first and second thermally-conducting frame members 120 and that covers a rear surface(s) of the radio(s) 140. The back plate 114 may comprise, for example, a plastic or metal plate that attaches to the first and second thermally-conducting frame members 120. In other embodiments, the first and second thermally-conducting frame members 120 and the back plate 114 may be formed as a single integral unit.

While the back plate 114 is implemented as a planar plastic or metal plate in the above-described embodiments, it will be appreciated that embodiments of the invention are not limited thereto. For example, in other embodiments, the back plate 114 may be formed of a thermally conductive material (e.g., aluminum) and may include not only a plate of material (or "base plate") but also a plurality of fins that extend outwardly from the base plate. The fins may comprise, for example, a series of thin metal protrusions that extend rearwardly from the base plate of back plate 114 and which run vertically in parallel to each other. For example, the fins may have the design of fins 28 shown in FIG. 1. In such embodiments, the radios 140 may directly contact the back plate 114 or the back plate 114 may be in thermal communication with the radios 140 through, for example, a thermal conductor such as graphene or a thermal pad or via a heat pipe. The fins included on the back plate 114 in such embodiments may enhance the ability of the antenna to vent heat generated by the radios 140 to outside the antenna.

Figure 11A:
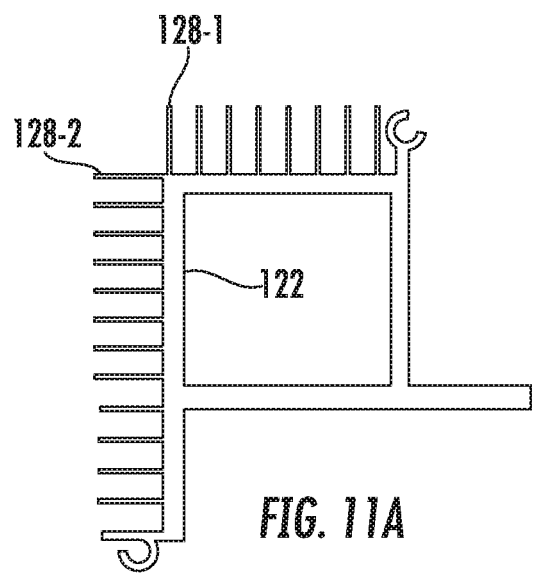
FIGS. 11A-11C depict alternative designs for the thermally-conducting frame members included in active antennas according to embodiments of the present invention.
Figure 11B:
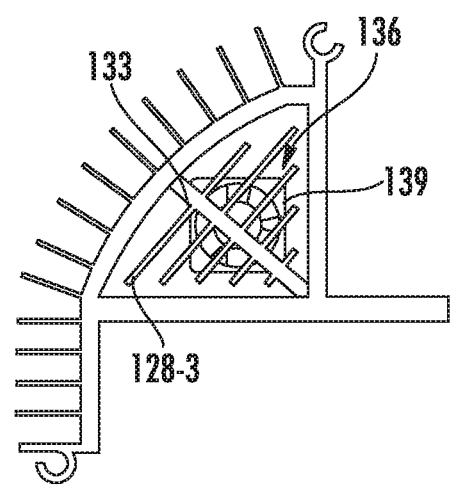
Figure 11C:
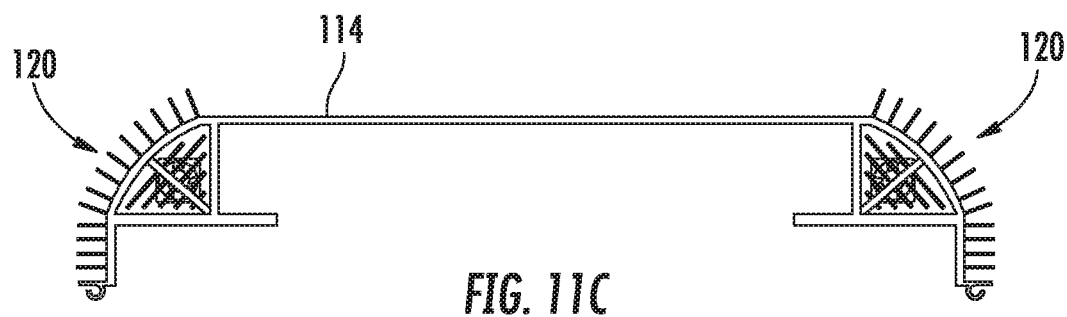

It will be appreciated that numerous modifications may be made to the active antenna 100 depicted in FIGS. 2-10 without departing from the scope of the present invention. For example, the shape of the first and second thermally-conducting frame members 120 may be modified in a variety of ways. FIG. 11A depicts one example alternative implementation of the thermally-conducting frame members 120 where the outer wall 122 includes a right angle bend (or a radiused right angle bend) as opposed to having the curved section 126 that transitions from the side surface to the back surface of the active antenna 100. This design may allow for a larger number of fins 128 to be included on each thermally-conducting frame member 120. As another example, FIG. 11B depicts another alternative implementation of the thermally-conducting frame members 120 in which a second inwardly extending flange 133 is added that bisects or otherwise extends across the channel 136. Additionally, internal fins 128-3 are added that extend from the second inwardly extending flange 133. Heat vented from the fins 128-3 may be blown by the fan 139 towards the bottom cap 118. The portion of the bottom cap 118 that is underneath each channel 136 may be formed of a material is impervious to water but that allows the heated air to be vented from the antenna 100. As yet another example, FIG. 11C depicts an alternative implementation in which the first and second thermally-conducting frame members 120 and the rear plate 114 are implemented as a single monolithic structure.

As discussed above, it will also be appreciated that the vapor chambers 146 may be replaced with other heat transfer elements such as other heat pipe designs. Additionally, in some embodiments, such as antennas that have lower power requirements (and hence less heat generation), active heat transfer structures such as heat pipes may be omitted and replaced with passive structures such as thermal pads that pass heat from the radio(s) to the thermally-conducting frame members.

It will likewise be appreciated that the number and type of radiating elements may be varied, as can the number of columns of radiating elements. The active antenna may support transmission in one or more frequency bands, and may or may not have diplexed radiating elements. Phase shifters for adjusting the electronic downtilt may or may not be included in the antenna.

The active antennas according to embodiments of the present invention may have a number of advantages over the conventional active antenna that is discussed above with reference to FIG. 1. For example, the use of frame members that have integrated heat sink structures allows the finned heat sinks that are typically included on the radios to be omitted. This can significantly reduce the depth of the active antenna, and removes structures that are mounted in the traditional locations for antenna mounting brackets, and which thus may complicate the mounting hardware and/or the mounting process for the antenna. Additionally, the thermally-conducting frame members may be formed by extrusion, which has significantly lower tooling costs than the tooling costs necessary for the die casting manufacturing techniques that are used to fabricate the finned heat sinks included on the radios of conventional active antennas. Thus, the active antennas according to embodiments of the present invention may be less expensive to fabricate. Additionally, higher conductivity aluminum may be used in extrusion processes than in die casting processes, and thinner structures such as fins may be formed using the extrusion process. Thinner fins may transfer heat more efficiently and may also allow for a greater number of fins, while also decreasing the amount of material required to form each frame member. Longer fins may also be used since the fins extend from the side surfaces of the housing as opposed to extending rearwardly. Thus, the active antennas according to embodiments of the present invention may exhibit better heat transfer using a physically lighter and less expensive heat transfer system.

Additionally, since the heat sinks may be integrated into the frame members, the heat sinks can serve both a heat transfer function while also providing support to the antenna. This may help reduce the overall amount of material used to support the internal components of the antenna. Additionally, in some embodiments, the radios may act as a portion of the support frame, which further reduces the amount of additional material required for support purposes. These features may further reduce the cost and weight of the active antennas according to embodiments of the present invention.

Moreover, the radios included in the active antennas according to embodiments of the present invention may be fully enclosed within the antenna housing, since the finned heat sinks included on the radios used in conventional active antennas can be omitted. Since the radios are fully enclosed, the antenna housing may provide environmental protection, and hence the extra waterproofing steps that were necessary on various conventional active antennas may be omitted with the active antennas disclosed herein.

Additionally, in antennas where the radios must have finned heat sinks mounted thereon that extend rearwardly outside the antenna housing, it may be necessary to mount the radios so that the RF ports extend forwardly toward the backplane. In such antennas, assembly issues may require the use of push-on blind mate connectors for the connections between one or both of the phase cables and the RF ports and/or the phase cables and the phase shifter assemblies. In contrast, in the active antennas according to embodiments of the present invention, the phase cables may be soldered to the phase shifter assemblies, and threaded connectors may be used to connect the phase cables to the RF ports on the radios. These soldered connections and threaded connectors may provide better electrical connections that are far less susceptible to PIM. Thus, the active antennas according to embodiments of the present invention may also exhibit improved RF performance. Additionally, the soldered connections may have lower insertion losses, further improving the RF performance.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that the above embodiments may be combined in any way to provide a plurality of additional embodiments.

That which is claimed is:

1. An active antenna, comprising:
a housing having a front surface, first and second side surfaces and a rear surface, wherein the front surface comprises a radome and the first and second side surfaces comprise respective first and second thermally-conducting frame members;
at least one radio that is mounted within an interior of the housing;
a backplane that extends laterally between and that is coupled to the first and second side surfaces; and
a plurality of radiating elements that are mounted to extend forwardly from the backplane,
wherein each of the first and second thermally-conducting frame members includes a plurality of outwardly extending fins.

2. The active antenna of claim 1, wherein the first and second thermally-conducting frame members comprise extruded members that are coupled to the radome.

3. The active antenna of claim 1, wherein the at least one radio is completely mounted within an interior of the housing, and wherein the at least one radio is mounted between the first and second thermally-conducting frame members and forms a part of a frame that provides structural rigidity to the active antenna.

4. The active antenna of claim 1, further comprising at least one heat pipe that is positioned to transfer heat generated by the at least one radio to the first thermally-conducting frame member, wherein the at least one heat pipe resides behind at least some of the plurality of radiating elements.

5. The active antenna of claim 1, wherein the first thermally-conducting frame member includes a channel that is between at least some of the fins and the at least one radio.

6. The active antenna of claim 5, further comprising a fan that is configured to move air through the channel.

7. The active antenna of claim 1, wherein the at least one radio includes a plurality of ports, and a plurality of phase shifters are mounted on a rear surface of the backplane.

8. The active antenna of claim 7, further comprising a plurality of phase cables, wherein each of the phase cables includes a first end having a threaded connector and a second end that is soldered to a respective one of the phase shifters.

9. An active antenna, comprising:
a housing having a front surface, first and second side surfaces and a rear surface, wherein the front surface comprises a radome and the first and second side surfaces comprise respective first and second thermally-conducting frame members;
at least one radio that is mounted within an interior of the housing;
a backplane that extends laterally between the first and second side surfaces; and
a plurality of radiating elements that are mounted to extend forwardly from the backplane,
wherein each of the first and second thermally-conducting frame members includes a plurality of outwardly extending fins,
wherein at least some of the plurality of radiating elements extend between the first and second side surfaces, and wherein at least some of the fins extend radially outwardly from a curved surface provided by a rearwardly extending wall section of at least one of the first and second thermally conducting frame members and that extends behind a forwardly extending straight section of the at least one of the first and second thermally conducting frame members.

10. An active antenna, comprising:
a rigid frame comprising a first thermally-conducting frame member, a second thermally-conducting frame member and a radio that extends between the first and second thermally-conducting frame members, wherein the first thermally-conducting frame member is a right side, longitudinally extending frame member, and wherein the second thermally-conducting frame member is a left side, longitudinally extending frame member that is laterally spaced apart from the first thermally-conducting frame member;
a backplane mounted to extend laterally between the first and second thermally-conductive frame members, wherein the backplane is coupled to the first and second thermally conductive frame members;
a rear plate that extends between the first and second thermally-conducting frame members and that covers a rear surface of the radio; and
a radome mounted on at least one of the rigid frame and the backplane.

11. The active antenna of claim 10, wherein each of the first and second thermally-conducting frame members is coupled to a radome in front of the backplane and includes a plurality of outwardly extending fins, and wherein the radio is thermally coupled to both the first and second thermally-conductive frame members.

12. The active antenna of claim 11, wherein at least some of the fins extend radially outwardly from a curved surface.

13. The active antenna of claim 10, further comprising at least one heat pipe that is positioned to transfer heat generated by the radio to the first thermally-conducting frame member, wherein the at least one heat pipe comprises a vapor chamber.

14. The active antenna of claim 10, wherein the first thermally-conducting frame member comprises a straight forwardly extending section that merges into a rearwardly extending curved section, and wherein the first thermally-conducting frame member includes a channel that is behind the straight section and in front of the curved section and between at least some of the fins and the at least one radio.

15. The active antenna of claim 14, further comprising a fan that is configured to move air through the channel.

16. An active antenna, comprising:
a first thermally-conducting frame member that includes a plurality of outwardly extending fins;
a second thermally-conducting frame member that includes a plurality of outwardly extending fins;
a radome coupled to the first and second thermally-conducting frame member;
a radio;
a heat pipe mounted on the radio, the heat pipe in thermal communication with the first and second thermally-conducting frame members;
a backplane mounted in front of the radio, laterally extending between the first and second thermally-conducting frame members and residing behind the radome; and
a plurality of radiating elements that are mounted to extend forwardly from the backplane,
wherein at least some of the fins extend radially outwardly from a curved surface that is integral to an outer wall of at least the first thermally-conducting frame member.

17. The active antenna of claim 16, wherein the active antenna defines at least part of a base station antenna, wherein the radio extends laterally and longitudinally and is mounted between the first and second thermally-conducting frame members, and wherein the radio and the first and second thermally-conducting frame members are cooperatively coupled together to thereby provide structural rigidity to the active antenna.

18. The active antenna of claim 16, wherein the active antenna defines at least part of a base station antenna, wherein the first and second thermally-conducting frame members comprise part of a housing of the active antenna, and wherein the radio is completely mounted within an interior of the housing.

19. An active antenna, comprising:
- a first thermally-conducting frame member that includes a plurality of outwardly extending fins;
- a second thermally-conducting frame member that includes a plurality of outwardly extending fins;
- a radio;
- a heat pipe mounted on the radio, the heat pipe in thermal communication with the first and second thermally-conducting frame members;
- a backplane mounted in front of the radio; and
- a plurality of radiating elements that are mounted to extend forwardly from the backplane,
- wherein at least some of the fins extend radially outwardly from a curved surface that is integral to an outer wall of the first thermally-conducting frame member,
- wherein at least some of the plurality of radiating elements extend laterally between the first and second side surfaces, wherein the first thermally-conducting frame member comprises a straight forwardly extending section that merges into a rearwardly extending curved section, and wherein the curved section defines the curved surface, and wherein the first thermally-conducting frame member includes a channel that is behind the straight section and in front of the curved section and between at least some of the fins and the at least one radio.

20. The active antenna of claim 19, further comprising a fan that is configured to move air through the channel.

* * * * *